April 25, 1967 I. I. KAPLAN ET AL 3,316,418

ALL PASSIVE FREQUENCY DETECTION CHANNEL

Filed May 9, 1963

INVENTORS.
IRVING I. KAPLAN
RALPH J. METZ
RICHARD H. TUZNIK
BY H. H. Losche
ATT'YS.

3,316,418

ALL PASSIVE FREQUENCY DETECTION CHANNEL

Irving I. Kaplan, Baltimore, and Ralph J. Metz, Ellicott City, Md., and Richard H. Tuznik, Winter Park, Fla., assignors, by mesne assignments, to the United States of America as represented by the Secretary of the Navy Filed May 9, 1963, Ser. No. 279,674
4 Claims. (Cl. 307—88)

This invention relates to frequency detection channels of radar systems, or like receivers, and more particularly to a frequency detection channel employing only passive elements in quartz crystal filters and Q-multiplier networks tuned to pass signals of predetermined frequency and to effectively decouple the channel for frequency signals other than the predetermined frequency.

In presently known frequency detection channels (FDC) vacuum tubes or transistors are used coupling the filter, through which the incoming intermediate frequency (IF) signals are applied, to a storage integrator core from which sampling or read-out is made through the use of interrogation circuitry. Such an FDC circuit utilizing transistors is more fully shown and described in the publication Communication and Electronics, Mar. 1961, No. 53, published by the American Institute of Electrical Engineers, in the article "Magnetics in Doppler Signal Data Extraction," by R. J. Metz and J. G. Ray, pp. 33–43, and particularly Figure 1. This article further shows and describes the environment in a radar system in which the FDC is used. The interrogation energy coupled to the storage integrator core lies in the frequency spectrum below approximately 600 kilocycles. The IF carrier frequency used is usually in the range of 30 kilocycles to 50 kilocycles and the vacuum tube or transistor coupling of the filter to the storage integrator core will effectively decouple the storage integrator core from the filter circuit during interrogation of the core. Decoupling of the interrogation energy from the filter is necessary to insure that no demagnetizing current is fed back into the filter during interrogation, to prevent interrogation energy from flowing through the filter to the other parallel connected FDCs where it would appear as false information, and to prevent the interrogation energy from flowing into the IF receiver which might be obliged to supply additional power to overcome this unwanted input.

In the known FDC, if the vacuum tube or transistor coupling could be changed to passive elements, the power required for the active elements could be reduced. It is not feasible to similarly achieve these necessary decoupling functions passively with the present inductance-capacitance (LC) filters designed for operation at 30 to 50 kilocycles. This is because the interrogation energy appearing on the windings of the storage integrator core is in the same frequency range as the IF carrier signal that must be transmitted to the core. Even if a resistor were used as a decoupling element, the inductors of the LC filter would be prohibitively large because of the large resistance required and the correspondingly greater signal power dissipation.

In the present invention an all passive FDC is produced by utilizing only passive elements which exploit the properties of two pole crystal filters mechanized with quartz crystal resonators for operation at an IF carrier frequency of about 2000 kilocycles, although lower IF could be used so long as it is above the frequency containing significant interrogation pulse energy. By increasing the IF carrier frequency from the usual range of 30 to 50 kilocycles to about 2000 kilocycles, which is much greater than the interrogating energy of about 600 kilocycles, it is possible to obtain the necessary decoupling between the interrogation energy and IF carrier signal energy. The advantages of such an all passive mechanization are the elimination of the power gain elements, such as vacuum tubes or transistors, the increased stability of signal transmission, and a more optimum use of the key elements of the FDC, the two-pole filter and the storage integrator core. The integration properties of the core likewise fulfill the detection functions formerly fulfilled by the vacuum tubes or transistors. In order to take the greatest advantage of the concepts presented above, the storage integrator core should be directly connected into the output of the two pole crystal filter. The filter would be designed with a bandpass characteristic such that it would pass only the required IF carrier frequencies with a specified bandpass characteristic and would reject the interrogation energy below 600 kilocycles. Unfortunately, up to the present time it has not been possible to completely fulfill the specified filter characteristics. Although present designs can achieve the required bandpass at the specified IF carrier frequencies, the low frequency response of these designs does not provide the necessary attenuation.

Further, in accordance with this invention, a passive, single pole network is interposed between the filter and the storage integration core which approximates the required attenuation characteristics. For this purpose a parallel resonant network would act as a high impedance passive decoupling circuit between the core and the filter at frequencies of 600 kilocycles, and at frequencies of about 2000 kilocycles the parallel resonant network would provide good coupling between the filter and the core. The action of such a Q-network can be further exploited to provide a signal current gain between the filter and core. Such a network is called a Q-multiplier. The advantages of utilizing the Q-multiplier to couple the filter and the core are that the required decoupling is achieved without the use of an active power gain element and that the increased signal power, required because of the crystal filter terminating impedance, is considerably reduced by the current gain achieved by the Q-multiplier. Moreover, at 2000 kilocycles the physical size of the air core inductor and capacitor required in the Q-multiplier circuit are small in size and weight and are stable. It is, therefore, a general object of this invention to provide a frequency detection channel circuit utilizing all passive elements with a Q-multiplier network capable of passing desired intermediate frequency signals in one direction and of decoupling signals of other lower frequencies in the other direction through the channel.

These and other objects and the attendant advantages, features and uses of this invention will become more apparent to those skilled in the art as the description proceeds when considered along with the accompanying drawing, in which.

Figure 1:
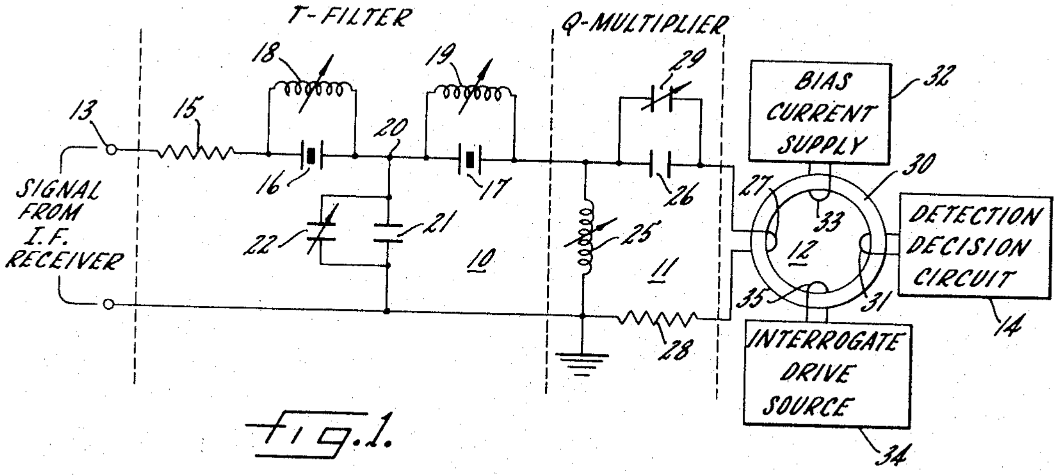
FIGURE 1 illustrates in circuit schematic and block circuit diagram a frequency detection channel in accordance with this invention.

Referring more particularly to FIGURE 1, a FDC consisting of the components in series of a crystal T-filter 10, a Q-multiplier circuit 11, and a storage integrator core component 12 are coupled between an IF receiver output and a detection decision circuit 14 output. The storage integrator core of the core component 12 performs an integration function of the IF input signals which likewise detects the IF signal for core setting in one of its residual flux stable states. The input from the IF receiver of the radar is applied to terminals 13 and through a resistance 15 to a quartz crystal T-filter having quartz crystals 16 and 17 in series. In parallel with the quartz crystal 16 is an adjustable inductance 18 and in parallel with the quartz crystal 17 is an adjustable inductance 19 for adjusting the filter bandpass. At terminal point 20 between the crystals 16 and 17 is coupled a capacitor 21 to a fixed potential such as ground, the capacitor 21 having a trimmer capacitor 22 in parallel therewith. Also, in accordance with this invention, the quartz crystal T-filter is constructed and arranged to pass IF in the order of 2000 kilocycles instead of 30 to 50 kilocycles as heretofore used in frequency detection channels. The T-filter as hereinabove described consists only of passive elements, the quartz crystals being used in this crystal filter to mechanize this filter for the handling of frequencies in the two megacycle range.

The output of the T-filter 10 is coupled as an input to the Q-multiplier 11, this Q-multiplier consisting of an adjustable inductance 25 in parallel to the input thereof. The output of the crystal 17 is coupled in series through a capacitor 26 and a "write in" inductive winding 27 and a trim resistor 28 to a fixed or ground potential. The capacitor 26 has a trimmer capacitor 29 in parallel therewith and the "write in" inductance 27 is wound on a core 30 of the storage integrator component 12. A detection decision circuit 14 is likewise inductively coupled to the core 30 by a winding 31. A bias current supply 32 has a winding 33 looping the core 30 to establish a direct current (D.C.) biasing voltage on the storage integrator core 30. An interrogate drive source 34 is inductively coupled to the storage integrator core 30 by a winding 35. The interrogate drive source 34 is constructed and arranged to operate at a pulse width resulting in frequencies below 660 kilocycles for the purpose of causing read-out of any signals stored in the storage integrator core 30. The Q-multiplier is tuned to pass frequency signals in the range of the IF, herein given as an example of about 2000 kilocycles, but will effectively decouple the T-filter 10 from the storage integrator component 12 for frequency in the range of the interrogating pulses, herein given as an example of 660 kilocycles or less.

As may well be understood by those skilled in the art, storage integrator cores such as 30 has opposite stable flux conditions, referred to as the residual flux levels of the cores. A complete discussion of the magnetic and electrical characteristics of square loop core operation is given in the text Basics of Digital Computers by John S. Murphy (1958), vol. 2, beginning on p. 78, and will not be fully described herein. The storage integrator core 30 can be placed in one residual flux condition by inductively applying a pulse of one polarity which will place the core in one stable condition until it is "reset" which is accomplished by applying a pulse inductively to the core in a polarity condition opposite to that for setting the core. The storage integrator core can be made to store information in binary form when the core is "set." This storage will represent the binary "1" when the core is "set" and will represent the "0" binary condition when the core is "reset." The detection decision circuit 14 will detect the binary state of the core 30 whenever a pulse is applied to the core by the interrogation drive source 34. It is to be understood by those skilled in the art that the detection circuit 14 includes diodes or other unidirectional elements therein to perform "read out" of the core 30 in the "1" or "0" state. By the unidirectional sensitivity of the detection circuit 14, this circuit will be insensitive to the core being "set" by another circuit having pulses in the same sense as the IF signal source but will be sensitive to "read out" the residual flux condition of the core 30 whenever an interrogating pulse is applied from the source 34. It is also to be understood that an interrogation pulse will destroy any binary "1" signal stored in the core and, upon destruction of this signal, "read out" will be accomplished in the detection circuit 14. It is also to be realized that the core 30 may not always be "set" to its saturated condition but to some degree of flux density below saturation. For example, referring to FIGURE 4, the "write-in" IF applied to the core 30 may take the form of a wave with irregular amplitude excursions to the right of the dotted line. Each excursion to the right which is greater than any preceding excursion will set the core 30 at a higher flux density level. This fulfills the integrating characteristics of the core which causes rapid increase in flux density once the knee of the B-H hysteresis curve is passed. However, the IF may not produce amplitude excursions sufficient to drive the core 30 to full saturation in which case "read-out" of the core in the detection decision circuit 14 will determine the degree of saturation by threshold detectors to provide target analysis. This analysis by post-detection is more fully discussed in the above-referred to publication of R. J. Metz and J. G. Fay with particular reference to Figure 2 thereof. While each of the windings 27, 31, 33, and 35, are shown as being single in this illustration, it is to be understood that each of the windings will be made with sufficient number of turns in accordance with good construction practice to obtain the desired results.

OPERATION

Figure 4:
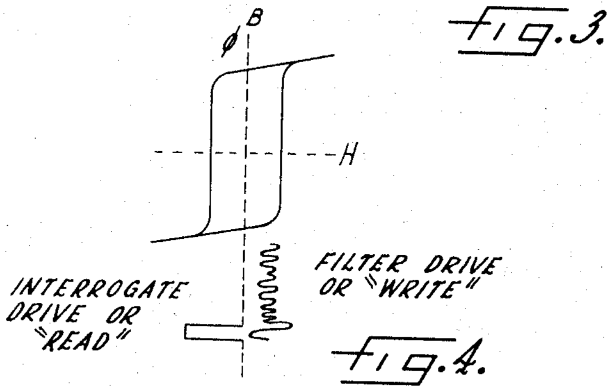
FIGURE 4 illustrates a B-H curve or hysteresis loop for the storage integrator core with illustrations of a drive signal and a read-out pulse thereon.

In the operation of the device as shown in FIGURE 1, an IF signal of sufficient amplitude and duration and of about 2000 kilocycles applied to terminals 13 will readily pass through the T-filter 10 and the Q-multiplier 11 to "set" the storage integrator core 30 in one residual flux state by integrating each IF pulse, herein referred to as a binary "1" state, since the T-filter 10 and the Q-multiplier 11 are low impedance circuits for this IF frequency. The biasing current supply 32 biases the core 30, as shown in FIGURE 4, to the optimum of the B-H curve so that the "write-in" signal as shown below the B-H curve will "set" the core to its "1" state. Upon sampling the integrating core 30 by the interrogate drive source 34 producing pulses of opposite polarity in the winding 35, the core 30 will be "reset" to its binary "0" state which, in so doing, will produce a flux change through the core 30 that will be detected as a stored signal by the detection circuit 14. This interrogate "read-out" pulse is illustrated in FIGURE 4 to the left of the dotted line and below the B-H or hysteresis curve. This induced voltage represents the interrogation drive pulse energy transformed by the core and is a measure of the flux state of the core. The shape of the resulting induced voltage wave form for the "1" binary state has an appearance that can be approximated by a triangular wave of peak amplitude $E_m$, base width $T_1$, and repetition time $T_r$ as shown in FIGURE 2.

Figure 2:
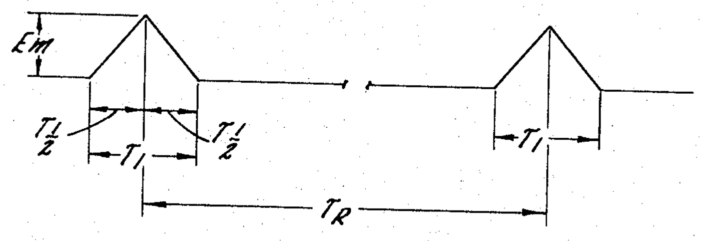
FIGURE 2 illustrates in a voltage and time graph the read-out pulses from a storage integrator core.

A Fourier analysis of the triangular wave form of FIGURE 2 reveals that an amplitude C of any *n*th harmonic can be described by $$C_n = E_{avg}\left[\frac{\sin n\pi\frac{T_1}{2T_R}}{n\pi\frac{T_1}{2T_R}}\right]^2$$

where $$E_{avg} = \frac{E_m T_1}{2T_R}$$

Figure 3:
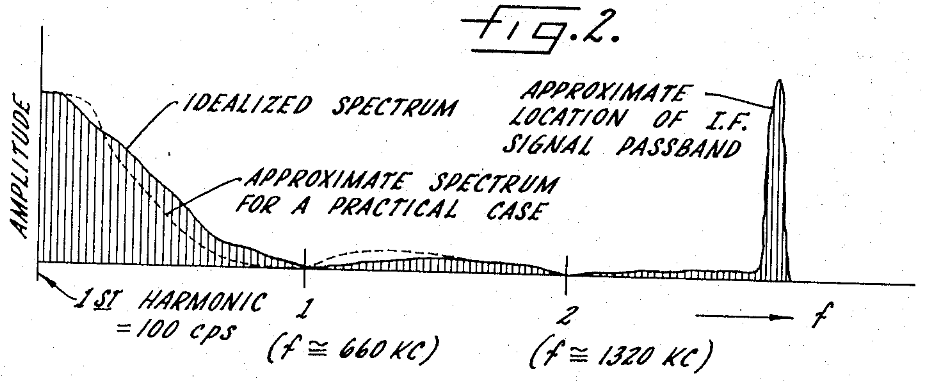
FIGURE 3 illustrates a plot of the envelope of the relative amplitude of the harmonics as a function of the frequency.

A plot of the envelope of the relative amplitudes of the harmonics as a function of frequency is shown in FIGURE 3. Each vertical line represents the magnitude of a harmonic at a particular frequency compared to the amplitude at the fundamental frequency. The spacing between harmonics depends upon the repetition time $T_R$ and is equal to $1/T_R$ or about 100 cycles per second. It is evident from FIGURE 3 that most of the energy in this wave form exists in the lower frequency spectrum and rapidly diminishes as the first null is reached. At the third null the energy is insignificant. Based upon the net switching time of the storage integrator core as it is typically used, the base width $T_1$ is about 3 microseconds and the repetition rate is about 100 cycles per second since $T_R$ is equal to about $10\times10^{-3}$ seconds. The first null is located at approximately 660 kilocycles and is a function of the wave shape and base width. It may readily be seen that the interrogate drive energy is primarily at frequencies below 660 kilocycles which will be confined to the core 30 since the Q-multiplier 11 substantially decouples this frequency from feeding back into the T-filter circuit 10 and into the IF signal source. Where a plurality of FDCs are used, as described in the above mentioned article of R. J. Metz and J. F. Gray, the interrogation drive pulse will be harmless to produce false signals in adjoining FDCs. The Q-multiplier circuit 11 achieves this decoupling for low frequency, in the order of the interrogation drive frequency, without the use of power gain elements. Likewise, increased signal power, required because of the crystal filter terminating impedance, is considerably reduced by the current gain achieved by the Q-multiplier. Further, at 2000 kilocycles the physical size of the air core conductor or capacitor required to mechanize the Q-multiplier are small in size and weight and are stable.

By this invention of raising the IF frequency signal to the range of about 2 megacycles, of utilizing a quartz crystal T-filter to pass this IF frequency, and to utilize a Q-multiplier circuit to couple at low impedance the 2 megacycle frequency signal from the crystal to the storage integrator core, utilizing a biased core to detect and integrate the IF signals, IF target signals can readily be stored in the integrator core without any feed back interference during "read out" by interrogation drive signals.

While many modifications and changes may be made in the constructional arrangement of the frequency detection channel as herein shown and described to accomplish "read-in" and "read-out" of storage integrator cores with all passive elements, it is to be understood that we desire to be limited in the spirit and scope of our invention only by the scope of the appended claims.

We claim:

1. An all-passive frequency detection channel for radar receivers comprising:

a filter adapted to be coupled to receive intermediate frequency carrier signals, said filter having all passive elements therein;

a storage integrator core for being set to a residual state by frequency signals;

a Q-multiplier network coupled in parallel to said filter and coupled in parallel to said storage integrator core by an inductive winding, said network including a variable inductance in parallel with said inductive winding coupling on said storage integrator core and with the coupling to said filter, one leg of said parallel coupling including a serially coupled capacitor with a trimmer capacitor in parallel therewith, and the other leg of said parallel coupling including a resistor to conduct intermediate frequency signals to said storage integrator core for setting same to said one residual state, said Q-multiplier network having all passive elements therein and tuned to said intermediate frequency; and an interrogation circuit inductively coupled to said storage integrator core to produce sampling pulses of low frequency below said intermediate frequency for read-out and destruction of the residual state of said core whereby said Q-multiplier decouples said filter from said storage integrator core during the application of said sampling pulses.

2. An all-passive frequency detection channel as set forth in claim 1 wherein said filter is a crystal T filter.

3. An all-passive frequency detection channel for radar receivers comprising:

a filter adapted to be coupled to receive intermediate frequency carrier signals;

a storage integrator core for being set in one of two residual flux states;

a Q-multiplier network having two conductor legs coupled to said filter with said legs being coupled inductively through a winding on said storage integrator core, said network including a variable inductance coupled across said two conductor legs, a capacitor in one conductor leg and a resistor in the other conductor leg with a trimmer capacitor in parallel with said capacitor, said Q-multiplier being tuned to pass said intermediate frequency carrier signals to said core through low impedance;

a detection decision circuit inductively coupled to said storage integrator core to detect read-out of any stored residual flux state thereof; and an interrogator drive circuit coupled to said storage integrator core to produce pulses and apply same to said core to cause read-out and destruction of stored residual flux states, said interrogator pulses being of a frequency lower than said intermediate frequency carrier signals whereby said Q-multiplier network produces a high impedance to said interrogator pulses to decouple said filter from said core during read-out and destruction of residual flux signals in said core.

4. An all-passive frequency detection channel for radar receivers comprising:

a crystal T-filter network adapted to be coupled to receive intermediate frequency carrier signals on an input thereof and pass them to an output thereof;

a Q-multiplier network having an input coupled to the output of said T-filter, said network having a capacitor, an inductive winding, and a resistor in series from said input to a fixed potential, and having an adjustable inductance in parallel with said input, said capacitor having a trimmer capacitor in parallel therewith;

a storage integrator core passing through said inductive winding for storing a residual flux signal when an intermediate frequency carrier signal is passed through said T-filter and said Q-multiplier to said core;

a bias current supply voltage inductively coupled through a winding to said core to establish optimum bias in said core with respect to its B-H characteristics;

an interrogation drive circuit inductively coupled to said core by a winding to produce sampling pulses of low frequency below said intermediate frequency carrier signals for read-out and destruction of stored residual flux signals; and a detection decision circuit coupled to said core by an inductive winding to detect the read-out of a stored residual flux signal upon the application of an interrogation pulse whereby intermediate frequency carrier signals are transmitted to said core by a low impedance coupling for its frequency, and interrogation pulses applied to said core are decoupled from said T-filter by high impedance coupling for interrogation pulse frequency.

References Cited by the Examiner

Metz, R. J., and Fay, J. G.: "Magnetics in Doppler Signal Data Extraction," Communication and Electronics, March 1961, pp. 34–36.

BERNARD KONICK, *Primary Examiner.*

S. M. URYNOWICZ, *Assistant Examiner.*